June 16, 1964     A. F. HADDOCK     3,137,421
HANDLE FOR FISHERMEN

Filed May 31, 1961     3 Sheets-Sheet 1

Arthur F. Haddock
INVENTOR.

BY *Clarence A. O'Brien*
*and Harvey B. Jacobson*
Attorneys

June 16, 1964    A. F. HADDOCK    3,137,421
HANDLE FOR FISHERMEN
Filed May 31, 1961    3 Sheets-Sheet 2
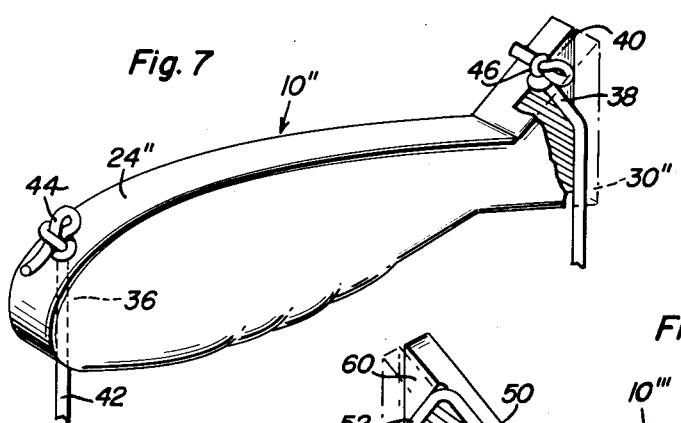
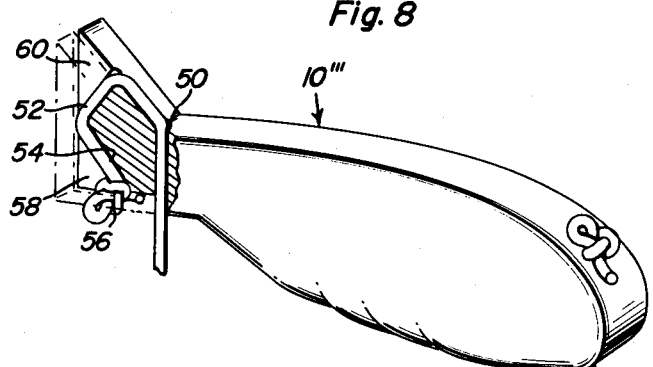
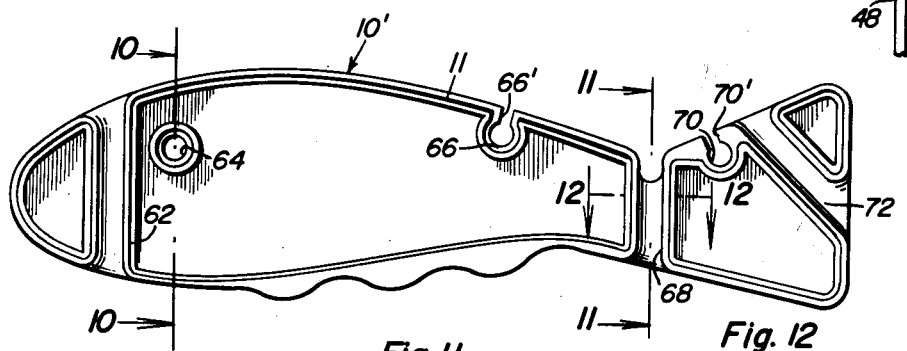
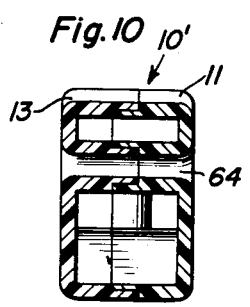
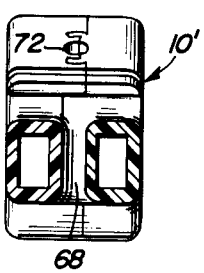
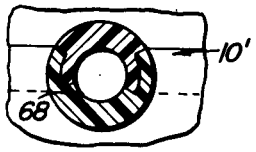
Arthur F. Haddock
INVENTOR.

June 16, 1964  A. F. HADDOCK  3,137,421
HANDLE FOR FISHERMEN
Filed May 31, 1961  3 Sheets-Sheet 3

Arthur F. Haddock
INVENTOR.

BY *Clarence A. O'Brien*
and *Harvey B. Jackson*
Attorneys

United States Patent Office 3,137,421
Patented June 16, 1964

3,137,421
HANDLE FOR FISHERMEN
Arthur F. Haddock, 710½ N. Mechanic St., El Campo, Tex., assignor of twenty-five percent to Tom Odom, El Campo, Tex.
Filed May 31, 1961, Ser. No. 113,861
4 Claims. (Cl. 224—7)

This invention relates to a novel and useful handle for fishermen which is specifically adapted to provide a convenient means for stringing fish and for carrying fish which have been threaded onto a stringing line.

Although the handle of the instant invention is illustrated and described herein as being specifically adapted for use by fishermen, it is to be understood that the handle may also be used as a handle for carrying various other types of articles.

The main object of this invention is to provide a handle provided with a stringing line which may be utilized to retain fish conveniently in a group.

A further object of this invention, in accordance with the immediately preceding object, is to provide a handle including a fish stringing line with the handle being constructed of buoyant material whereby it may be secured to one end of the fish stringing line and utilized as a float by a fisherman wading in water while the other end of the fish stringing line is secured to the belt of the fisherman in order that the fish may be maintained and secured within the water and yet within sight of the fisherman who may thereby protect the fish from predators such as turtles.

A further object of this invention is to provide a handle provided with means for securing longitudinally spaced portions of a fish stringing line thereto in a manner to loop the intermediate portion of the stringing line disposed between those portions of the line secured to the handle thereby enabling a relatively longer fish stringing line to be utilized and conveniently carried by means of the handle.

Yet another object of this invention is to provide the handle with a comfortable handgrip thereby reducing the possibility of the handle slipping out of a fisherman's hand when the fisherman is carrying strung fish by means of the handle.

Another object of this invention is to provide a convenient means for stringing fish which may be utilized in connection with a relatively long fish stringing line and used to form more than two loose loops in the fish stringing line in order that the fish stringing line may be doubled several times in the form of a plurality of loops thereby enabling an extremely long fish stringing line to be conveniently carried by means of the handle of the instant invention.

A final object to be specifically enumerated herein is to provide a device in accordance with the preceding objects which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 7 and 8 are perspective views of modified forms of the handle with several of the securing means illustrated in FIGURES 1 through 6 omitted and rear portions of the handles broken away and shown in longitudinal vertical section to illustrate the manner in which the terminal end portions of a fish stringing line may be secured to the rear end portions of the handles;

FIGURE 9 is a side elevational view of one half of a modified form of handle which is hollow and includes half sections joined together along a vertical plane passing through the longitudinal center line of the modified form of handle;

FIGURE 10 is a vertical sectional view taken substantially upon the plane indicated by section line 10—10 of FIGURE 9;

FIGURE 11 is a vertical sectional view taken substantially upon the plane indicated by section line 11—11 of FIGURE 9;

FIGURE 12 is a fragmentary horizontal sectional view taken substantially upon the plane indicated by section line 12—12 of FIGURE 9;

Figure 14:
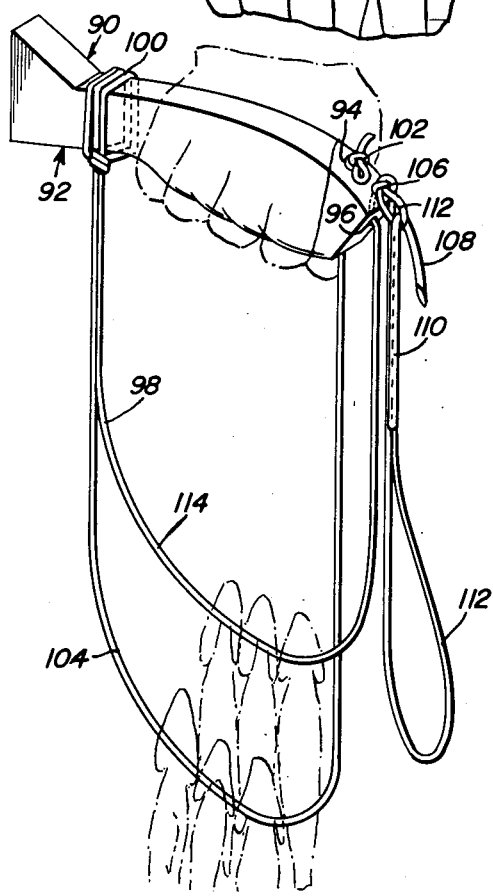
Figure 15:
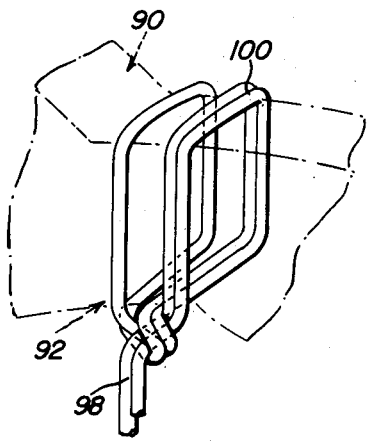

FIGURE 14 is a perspective view of a modified form of fish stringing handle with several of the securing means being omitted and illustrating a different manner in which a fish stringing line may be supported by the handle; and FIGURE 15 is an enlarged perspective view of the rear end portion of the handle illustrated in FIGURE 14 showing the manner in which a double half hitch is formed in an intermediate portion of a fish stringing line to secure the line about the reduced portion of the handle, the handle being illustrated in phantom lines.

Referring now more specifically to the drawings, the numeral 10 generally designates the handle of the instant invention. It will be noted that the handle 10 is provided with the configuration of a fish including a forward body portion 14 and a rear tail portion 16 defined by a reduced intermediate portion 18. The handle 10 includes opposite side surfaces 20 and 22 and top and bottom surfaces 24 and 26 which are interconnected by means of front and rear surfaces 28 and 30. It will be observed that the forward ends of the top and bottom surfaces 24 and 26 curve toward each other and are joined by the curved front surface 28. The top and bottom surfaces of the tail portion 16 are rearwardly divergent.

Figure 5:
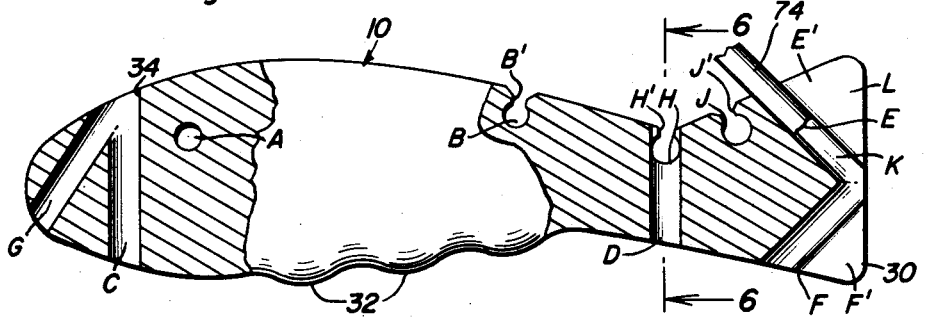
FIGURE 5 is a side elevational view of the handle with the front and rear portions thereof being shown in vertical longitudinal section.
Figure 6:
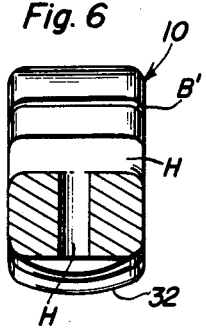
FIGURE 6 is a transverse vertical sectional view taken substantially upon a plane indicated by section line 6—6 of FIGURE 5.

With attention now directed to FIGURE 5 of the drawings it will be noted that the handle 10 which comprises an elongated grip member provided with gripping surfaces 32 along the mid-portion of the lower surface 26 has a plurality of transversely extending generally horizontally disposed bores A, B, H and J, which extend between and open through the side surfaces 20 and 22.

The bore A is formed through the forward portion of the body portion 14, the bore B is formed through the rear portion of the body portion 14, the bore H is formed through the reduced intermediate portion 18 and the bore J is formed through the tail portion 16. The bores B, H and J are each disposed adjacent the top surface 24 and are provided with transversely extending slots B', H' and J' respectively which communicate the bores B, H and J with the top surface 24.

The grip member is also provided with upstanding bores C, D, E, F and G. The bores C and G are formed in the forward portion of the body portion 14 forwardly of the bore A and the bore C is substantially vertically disposed while the bore G is forwardly and downwardly inclined and communicates with the upper end of the bore C at its upper end to form an enlarged opening 34.

The bores E and F are formed in the tail portion 16 and are rearwardly convergent and joined at their rear ends to form an angulated bore K. Each of the bores E and F is provided with a slot E' and F', respectively, which communicate the bores E and F with the rear end of the grip member. The slots E' and F' define a continuous slot L.

It will be noted that the slot B', H', J', E' and F' are each of a width less than the diameter of the associated bore.

With attention now invited to FIGURES 9 and 10, there will be seen a modified form of handle generally referred to by the reference numeral 10' which includes a pair of hollow half sections 11 and 13 which are joined together in any convenient manner generally along a vertical plane passing through the longitudinal center line of the handle 10'. The half sections 11 and 13 may be secured together in any convenient manner such as by gluing or fusion and they may be constructed of any suitable material such as plastic. Although the handle 10' is not illustrated as including bores corresponding to bores E and F and slots E' and F', it is to be noted that these components may be provided if desired. Bores and slots comprise a means for securing a portion of a fish stringing line to the corresponding handle and one or more of these means may be used at any given time.

As illustrated in FIGURE 7 of the drawings, a handle generally referred to by the reference numeral 10" includes only a bore 36 corresponding to bore C and a bore 38 corresponding to bore E provided with a corresponding slot 40. In use of the handle 10", one terminal end portion of a fish stringing line 42 is inserted upwardly through the bore 36 and is mounted with a slip knot as at 44 after passing through the upper surface 24". The other terminal end portion of the fish stringing line 42 extends upwardly to the rear of the lower portion of the rear surface 30" and extends through the bore 38 and is knotted with a slip knot 46 after passing through the upper surface 24". It will be noted that the portion of the fish stringing line 42 disposed through the bore 38 may be forced through the narrow slot 40 in order to disengage that corresponding terminal end portion of the fish stringing line 42 from the handle 10. This end of the line may then be used to string a fish onto the line and thereafter may be forced inwardly through the slot 40 to again be secured to the handle 10".

In FIGURE 8 there is illustrated a handle generally referred to by the reference numeral 10'" and the fish stringing line 48 is secured to the forward portion of the handle in the same manner as the line 42 is secured to the handle 10". However, the handle 10'" includes a bore 50 corresponding to bore D and the other terminal end portion of the fish stringing line 48 is passed upwardly through the bore 50 and then downwardly through the bore 52 corresponding to bore E and downwardly through bore 54 corresponding to bore F. This terminal end portion of the line 48 is then knotted with a slip knot as at 56 after passing through the lower end of the bore 54. The end of the fish stringing line 48 adjacent the knot 56 may be disengaged from the handle 10'" by forcing the line through the slots 58 and 60 which communicate the bores 54 and 52 respectively with the rear end of the handle 10'" and then pulling the line 48 downwardly through the bore 50.

It will be noted that the handle 10' illustrated in FIGURE 9 includes bores 62, 64, 66, 68, 70 and 72 corresponding to bores C, A, B, D, J and K respectively and that the bores 66 and 70 include corresponding slots 66' and 70'.

Figure 1:
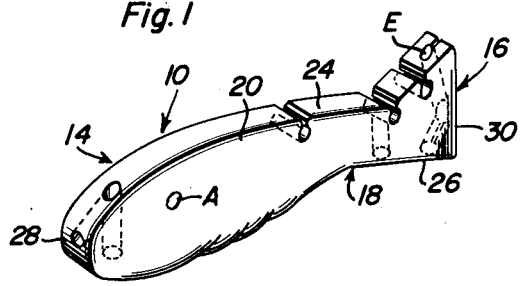
FIGURE 1 is a perspective view of the handle of the instant invention including a plurality of means for securing longitudinally spaced portions of a fish stringing line to the handle in order to form one or more loops in the fish stringing handle which means may be used in groups of two or more as desired.
Figure 2:
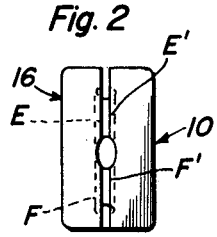
FIGURE 2 is a rear end elevational view of the handle as seen from the right side of FIGURE 1.
Figure 3:
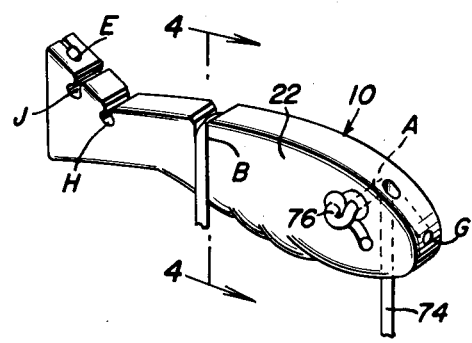
FIGURE 3 is a perspective view of the handle shown in a different position and terminal end portions of a fish stringing line secured thereto.
Figure 4:
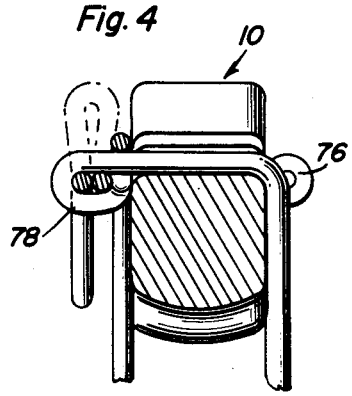
FIGURE 4 is a vertical sectional view on somewhat of an enlarged scale taken substantially upon the plane indicated by the section line 4—4 of FIGURE 3.

It will be noted that the terminal end portions of a fish stringing line 74, see FIGURE 3, may be secured to the handle 10 by passing one terminal end portion of the line through the bore A and knotting the line with a slip knot as at 76. Additionally, the other end of the fish stringing line 74 may be passed through the bore B and knotted with a slip knot as at 78. In this manner, it will be noted that one end portion of the line 74 extends downwardly along one side surface of the handle 10 and that the other end portion of the line 74 extends downwardly along the other side surface of the handle 10. In this manner, the handle 10 may be balanced. As the line 74 may be inserted through the bore A in either direction and may be inserted through the bore B in the opposite direction, the handle 10 is adaptable for both right handed and left handed fishermen.

The end of the fish stringing line 74 disposed through the bore B may also be similarly disposed through the bores H and J either as a substitute for the bore or in addition thereto in order to form a second loop in the fish stringing line 74 for supporting fish.

Figure 13:
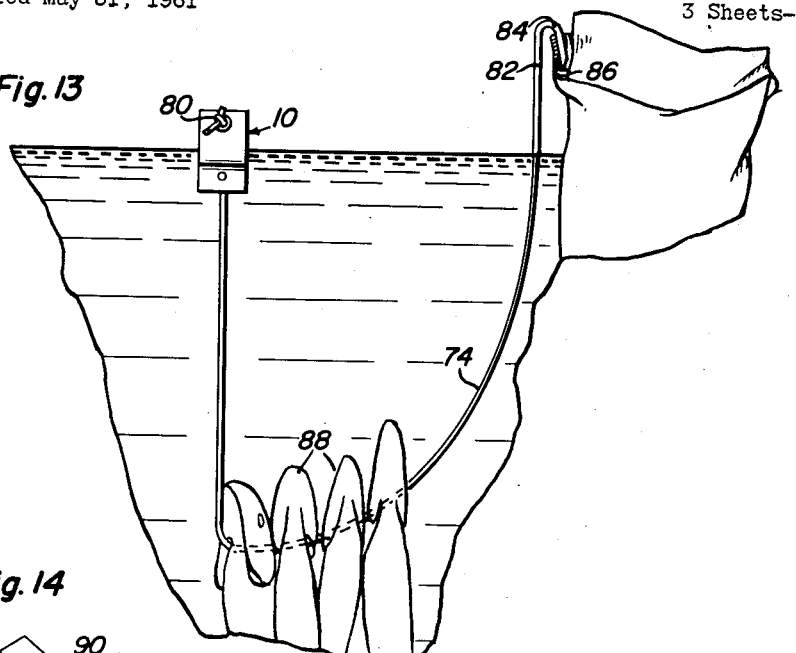
FIGURE 13 is an elevational view showing one method of utilizing either of the handles illustrated in FIGURES 1 through 12 with the handle being used as a float and having one end of a fish stringing line secured thereto and the other end of the fishing stringing line secured to the belt of a fisherman.

With attention now invited to FIGURE 13 of the drawings it will be noted that one end portion of the fish stringing line 74 may be secured through the bore C and knotted with a slip knot as at 80 and the other end portion of the fish stringing line 74 may be provided with a hook or stringing needle 82 whose shank portion forms a continuation of the line 74 and whose hook portion 84 may be engaged with the belt 86 of a fisherman or passed upwardly through the bore G. In this manner, the handle 10 may be used as a float and the fish 88 may be supported in the water on the fish stringing line 74 and yet maintained in a position whereby they may be readily observed by the fisherman in order to protect the fish 88 from predators or the line, with the fish strung thereon, may be lifted and carried about by the fisherman merely grasping and lifting the handle 10.

With attention now invited to FIGURES 14 and 15 of the drawings there will be seen a modified form of the handle generally referred to by the reference numeral 90 which includes a reduced intermediate portion 92 similar to intermediate portions 18 and bores 94 and 96 similar to bores C and G but being spaced apart at their upper ends. The fish stringing line 98 has its mid-portion knotted about the reduced intermediate portion 92 by means of a double half-hitch knot 100 and one terminal end portion of the line 98 is passed upwardly through the bore 94 and knotted with a slip knot as at 102 to form a first loop 104 for supporting fish. The other terminal end portion of the line 98 is passed upwardly through the bore 96 and is knotted with a slip knot 106 a spaced distance from the end thereof. The hooked portion 108 of the hook 110 may then be engaged with the loose loop 111 of the slip knot 106 in order to support the hook 110 as illustrated in FIGURE 14. If the line 98 is of sufficient length, a third loop 112 in addition to the first loop 104 and the second loop 114 disposed between the double half-hitch 100 and the bore 96 may be provided and also utilized to support fish. Still further, the hooked portion 108 may have its pointed end passed upwardly through bore 96 instead of through the loose loop 111 in order to form the third loop 112, in which instance the slip knot 106 is not needed and is omitted.

In addition to the various methods of securing a fish stringing line to the handle 10 hereinbefore set forth, the terminal end portion of a fish stringing line may be inserted upwardly through the bores C and D and knotted with suitable slip knots. Further, one terminal end portion of a fish stringing line may be inserted upwardly through either of the bores C and G and knotted with a slip knot and the other end portion of the fish stringing line may be secured about the reduced intermediate portion 18 by means of a half-hitch. Still further, any one of the bores A, C and G may be utilized to secure one end portion of the fish stringing line to the body 10 with either of the bores B, H and J being utilized to secure the other end portion of a fish stringing line to the handle 10.

Accordingly, it may be readily seen that the handle of the instant invention may be used in a plurality of different ways in combination with a fish stringing line in order to provide a novel means of supporting strung fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fisherman's handle for stringing fish and carrying strung fish, said handle comprising an elongated grip member having opposite sides and top and bottom surfaces interconnected by means of opposite front and rear surfaces, a stringing line, one end of said grip member having a first upstanding bore formed therein opening upwardly through said top surface, one end of said line being inserted upwardly and secured through said bore, the other end of said grip member including a portion spaced from the terminal end thereof reduced in transverse dimension and adapted to have a mid-portion of said line secured thereabout, said other end of said grip member, on the side of said reduced portion remote from one end of said grip member, including a rearwardly and upwardly inclined second upstanding bore opening downwardly through said bottom surface and upwardly through said rear surface, a stringing needle having a straight shank portion to one end of which is secured the other end of said line, the other end of said shank portion terminating in a reversely curving hook portion, said needle being positionable alongside said grip member with said shank portion overlying said top surface and at least the free end of said hook portion received in the upper end of said upstanding bore and said needle secured to said grip member by the wrapping of said line about said grip member and said shank portion when said handle and needle are to be stored.

2. The combination of claim 1 wherein said grip member includes means defining a rearwardly and downwardly inclined groove in its rear end opening rearwardly and upwardly of said grip member and communicating said top surface with said rear surface and in which said line is receivable.

3. The combination of claim 1 including a transverse bore formed through said grip member opening through opposite side surfaces thereof and adapted to have a portion of said line passed therethrough.

4. The combination of claim 3 including a transverse slot formed in said grip member generally paralleling said last mentioned bore and communicating the latter with the top surface of said grip member, said transverse slot being of a width less than the diameter of said transverse bore.

References Cited in the file of this patent

UNITED STATES PATENTS

| 541,729 | Dillin | June 25, 1895 |
| 2,269,615 | Walker | Jan. 13, 1942 |
| 2,273,442 | Hedu | Feb. 17, 1942 |
| 2,427,715 | Cooper | Sept. 23, 1947 |
| 2,448,894 | Laus | Sept. 7, 1948 |
| 2,455,766 | Harvey | Dec. 7, 1948 |